(12) United States Patent
Toscano et al.

(10) Patent No.: US 8,891,369 B2
(45) Date of Patent: Nov. 18, 2014

(54) NETWORK NODE AND METHOD OF OPERATING A NETWORK NODE

(75) Inventors: Orazio Toscano, Genoa (IT); Stefano Deprati, Genoa (IT); Sergio Lanzone, Genoa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 649 days.

(21) Appl. No.: 12/809,588

(22) PCT Filed: Dec. 21, 2007

(86) PCT No.: PCT/EP2007/064485
§ 371 (c)(1),
(2), (4) Date: Nov. 1, 2010

(87) PCT Pub. No.: WO2009/080121
PCT Pub. Date: Jul. 2, 2009

(65) Prior Publication Data
US 2011/0044202 A1 Feb. 24, 2011

(51) Int. Cl.
*H04B 7/212* (2006.01)
*H04L 12/54* (2013.01)
*H04L 12/64* (2006.01)
*H04L 12/701* (2013.01)
*H04B 7/216* (2006.01)

(52) U.S. Cl.
CPC ........ *H04L 12/5692* (2013.01); *H04L 12/5695* (2013.01); *H04L 12/6402* (2013.01); *H04L 45/00* (2013.01)
USPC ....................................... 370/230.1; 370/235

(58) Field of Classification Search
USPC .......................................... 370/253, 389, 458
See application file for complete search history.

(56) References Cited

U.S. PATENT DOCUMENTS

| | | | | |
|---|---|---|---|---|
| 5,486,784 A | * | 1/1996 | Eriksson | 327/165 |
| 7,649,910 B1 | * | 1/2010 | Wechsler et al. | 370/503 |
| 2004/0258099 A1 | * | 12/2004 | Scott et al. | 370/503 |
| 2005/0025038 A1 | * | 2/2005 | Ying et al. | 370/203 |
| 2005/0100054 A1 | * | 5/2005 | Scott et al. | 370/503 |

(Continued)

FOREIGN PATENT DOCUMENTS

| | | |
|---|---|---|
| EP | 0 658 019 A1 | 6/1995 |
| EP | 1 432 161 A2 | 6/2004 |
| WO | 2005/003880 A2 | 1/2005 |

OTHER PUBLICATIONS

Stein, R. et al. RAD Data Communications: "Time Division Multiplexing over IP" Network Working Group Request for Comments: 5087, Jun. 2006.
PCT International Search Report, dated Jul. 15, 2008, in connection with International Application No. PCT/EP2007/064485.

(Continued)

*Primary Examiner* — Eunsook Choi
(74) *Attorney, Agent, or Firm* — Leffler Intellectual Property Law, PLLC

(57) ABSTRACT

Network node comprising input equipment, switching equipment and output equipment, the input equipment is arranged to be capable of packetizing time division multiplexed (TDM) traffic flows, the switching equipment is arranged to be capable of routing the packetized data from the input equipment to the output equipment, and the output equipment is arranged to be capable of reassembling the flows into time division multiplexed format, wherein the input equipment is also arranged to be capable of causing the data frequency of the packetized data sent to the switching equipment to be substantially equal to a predetermined data frequency.

14 Claims, 6 Drawing Sheets

(56) References Cited

U.S. PATENT DOCUMENTS

2006/0146865 A1* 7/2006 Crowle et al. .............. 370/463
2006/0187822 A1* 8/2006 Peleg .......................... 370/229
2007/0223484 A1* 9/2007 Crowle et al. .............. 370/394

OTHER PUBLICATIONS

Stein, R. et al. RAD Data Communications: "Time Division Multiplexing over IP" Network Working Group Request for Comments: 5087, Dec. 2007.

* cited by examiner

NETWORK NODE AND METHOD OF OPERATING A NETWORK NODE

TECHNICAL FIELD

The invention relates generally to network nodes.

BACKGROUND

Among the various issues that need to be taken into account in the deployment of the Next Generation Network, the clock processing of the Time Division Multiplexed (TDM) signals switched in the packet network nodes is one of the most crucial and critical ones.

Due to the nature of known packet network nodes (e.g. Ethernet) and in particular the non-constant traffic delay through their data switch fabrics there are a number of different synchronization problems that need to be addressed to match the node egress traffic quality requirements. In this regard, reference is made to International Telecommunications Union (ITU) G.707 "Network Node Interface for the Synchronous Digital Hierachy (SDH) and to ITU G.783 "Characteristics of Synchronous Digital Hierachy (SDH) Equipments Functional Blocks".

Synchronization is required in telecommunication networks in order to meet network performance and availability requirements. Poor network synchronization will lead to large amounts of so-called jitter and wander. Jitter and wander can lead to transmission errors and buffer under/overflow. Both of those faults result in service problems causing high error rates and can lead to service unavailability. Synchronization in TDM networks is well understood and implemented. Typically, a TDM circuit service provider will maintain a timing distribution network, providing synchronization traceable to a Primary Reference Clock (i.e., clock compliance with ITU-T Recommendation G.811). By synchronisation we mean each unit of time of each system clock corresponds to the same, or substantially the same, unit of time as indicated by the reference clock. Network Synchronization requirements must therefore be carefully considered when networks are deployed.

Packet switching was originally introduced to handle asynchronous data. However, for more recent and future applications relating to TDM services the strict synchronization requirements of those applications must be considered. On the other hand, when the TDM services are carried over a packet network or only switched through packet network nodes data fabric switches some critical aspects arise. The so-called Packet Delay Variation (PDV) introduced by a packet network and/or by packet network nodes data fabric switches is one of the main problems that needs to be addressed. PDV comes about as a result of congestion, internal spreads and different flows passing through the fabric.

FIG. 1 shows a known network 1 arranged to handle TDM traffic which is to be conveyed over a Packet Switched Network (PSN). In the scheme an edge node 2 is at the edge of both a PSN (data) network and of a PSTN (Public Switched Telephone Network, i.e. TDM) network. Counterpart edge nodes 8 and 9 are located on the other sides of the networks. In this very flexible application extensions of the edge node ingress interfaces can accept a variety of different traffic types (e.g. Data interfaces [e.g. Ethernet], TDM traffic [e.g. SDH/SONET/POS/PDH and so on]) and to apply them a flexible number of processes in both the PSN and the PSTN networks. The edge node 2 comprises a plurality of input traffic cards on a receiving side of the node, and a plurality of output traffic cards on a transmitting side of the node and a plurality of data switch fabric cards therebetween. The switch fabric cards connect the outputs of the input cards to the inputs of the output traffics cards.

In the PSN bound direction the data interfaces can be required to be classified, policed, switched/routed, scheduled and so on, and the TDM interfaces can be required to be "Circuit Emulated", i.e. segmented and encapsulated into data packets to the PSN network, or can be required to be TDM terminated in order to extract the embedded data payload (e.g. Ethernet) to be processed in the same way of the native data interfaces (e.g. classified, policed and so on).

In the PSTN bound direction the ingress data interfaces can be mapped into a TDM frame (e.g. Ethernet over SONET) and the TDM ingress interfaces can be monitored and cross-connected (switched). In this latter case of TDM ingress interfaces, TDM cross-connections and TDM egress interfaces to the PSTN network, the TDM requirements must be taken into account in the configuration of the edge node.

Whilst some hybrid systems comprise both a data switch fabric and a TDM switch fabric, state of the art data switching fabric equipment comprises a single high performance data switch fabric system able to switch all the different traffic types. This space and cost optimization allows maximization of the number of the traffic slots available in the physically constrained rack size and to obtain a cost-effective and more flexible equipment.

The expression 'switch fabric' is generally understood to include data processing equipment that is configured to move data coming into a network node (the ingress traffic) out by the correct port (i.e. egress traffic) to the next node in the network.

From the synchronization effects point of view one of the greatest differences between a typical TDM traffic switch fabric system and a data traffic switch data system is the fact that a TDM switch fabric is capable of performing all of the required cross-connection functions with a constant latency while the typical behaviour of a data traffic switch data system is characterized by a low, but non-zero, delay variation (i.e non-constant latency). From this point of view the requirement to have TDM egress interfaces in compliance with the international recommendations synchronization requirements (e.g. the ITU-T requirements) are in this case much more challenging and requires complex and expensive filtering and cleaning functions in the egress cards of the edge node to compensate or mitigate synchronisation impairments (i.e. variations in the data frequency) introduced by the data fabric.

Considering again the arrangement shown in FIG. 1, an egress TDM interface 7 is composed of the same components (e.g. SDH Virtual Containers Vc3, Vc4 and so on) collected from different ingress TDM interfaces 4, 5 and 6 via a cross-connection function of switching fabric equipment of the edge node 1. The data frequencies of traffic of the ingress TDM interfaces are not synchronous among themselves but rather are characterized by (slightly) different frequencies, albeit within the constrained frequencies accuracies. This is due to causes including network noise, network impairments and component precision.

After a segmentation process is performed on the ingress traffic, the packetised traffic is cross-connected across the node by the switching fabric to an appropriate output card where it is then reassembled into TDM form for transmission to the PSTN network. This is the so-called SaR, or Segmentation and Reassembling, process, performed by the edge node, the different containers are each characterized by a respective ingress frequency modified by FDV of the switch fabric.

The task to clean or substantially eliminate this effect is significant and expensive but is nevertheless mandatory in order to meet the egress TDM (e.g. SDH STM-1) synchronization requirements; (in the example SDH case, for instance, the FDV contribution can cause undesired and unacceptable burst Vc pointer re-justification movements).

Considering the general position, an edge node has N TDM input interfaces each one characterized by a nominal frequency $f_{nom}$, typical of the particular TDM interface and speed and an actual instantaneous frequency $f_{in1}, \ldots, f_{inN}$ within the recommended frequency accuracy $\Delta f_{in}$.

Therefore, there are N non-synchronous TDM interfaces with frequencies:

$$f_{in1}(t) = f_{nom} + \Delta f_{in1}(t) \Delta f_{in1}(t) < \Delta f_{in}$$

$$f_{in2}(t) = f_{nom} + \Delta f_{in2}(t) \Delta f_{in2}(t) < \Delta f_{in}$$

$$f_{inN}(t) = f_{nom} + \Delta f_{inN}(t) \Delta f_{inN}(t) < \Delta f_{in}$$

In this general scenario each TDM frame is composed of M asynchronous multiplexed flows (the case of M synchronous flows can be considered a particular case of this general scenario).

The egress filtering process (i.e. the process to ensure that the frequency of the TDM traffic output is substantially that of the node's (regulated) local clock) can be described as a function that receives $f_1+\Delta_1; f_2+\Delta_2; \ldots; f_n+\Delta_n$ as inputs (with $f_1, \ldots, f_n$ and $\Delta_1, \ldots, \Delta_n$ all unknown quantities) and provides $f_1+\Delta_{1f}; f_2+\Delta_{2f}; \ldots; f_n+\Delta_{nf}$ as outputs with the aim to minimize the $\Delta_{1f}; \ldots; \Delta_{nf}$ terms.

The processing task for the egress cards of the edge node to take account of effects of both FDV and the various different frequencies which were received by the ingress cards so that the egress cards output TDM flows which have the required (system) data frequency is an onerous one.

We have realised that it would be desirable to adopt a new approach to address the issue of switching TDM traffic through a data switch fabric and provide a method to minimize synchronization impairments in the egress TDM traffic signals.

SUMMARY

According to the invention there is provided a network node comprising input equipment, switching equipment and output equipment. The input equipment is arranged to be capable of packetising time division multiplexed (TDM) traffic flows. The switching equipment is arranged to be capable of routing the packetised data from the input equipment to the output equipment. The output equipment is arranged to be capable of reassembling the flows into time division multiplexed format. The input equipment is also arranged to be capable of causing the data frequency of the packetised data sent to the switching equipment to be substantially of a predetermined data frequency.

According to another aspect of the invention there is provided data processing equipment which is configured to be capable of packetising time division multiplexed (TDM) traffic flows, the equipment being suitable for connection to packet data switching equipment. The data processing equipment is arranged such that, in use, the flows are processed such that the data frequency of packetised data output by the data processing equipment is substantially of a predetermined data frequency.

According to yet a further aspect of the invention there is provided a method of processing time division multiplexed (TDM) traffic flows comprising processing the flows to generate packetised data having a data frequency substantially equal to a predetermined data frequency. Routing the packetised data across switching equipment (17, 18) and then converting the packetised data into time division multiplexed format.

Another aspect of the invention comprises machine readable instructions for controlling data processing equipment, which when run by the data processing equipment cause the equipment to process received flows of time division multiplexed data such that packetised data is output by the data processing equipment which has a data frequency which is substantially of a predetermined data frequency.

One embodiment of the invention may be viewed as a method of applying a TDM traffic re-justification process before passing through data fabric switching system such that all of the TDM traffic flows which are input into the data fabric switching system are characterized by a single, predetermined, system frequency.

In one embodiment of the invention an egress filtering process performed by the output equipment can be described as a function receiving $f_1+\Delta_1; f_2+\Delta_2; \ldots; f_n+\Delta_n$ as inputs (with $f_1=f_2=\ldots=f_n$ and all equal to a known frequency value) and providing $f_1; f_2; \ldots; f_n$ as outputs with the ability to reduce the $\Delta_{1f}; \ldots; \Delta_{nf}$ terms to (substantially) null values and therefore to completely compensate the switch data fabric FDV. This egress filtering process is technically simpler and cheaper as compared to known methods.

BRIEF DESCRIPTION OF THE DRAWINGS

Various embodiments of the invention will now be described, by way of example only, with reference to the accompanying drawings in which.

DETAILED DESCRIPTION

Figure 1:
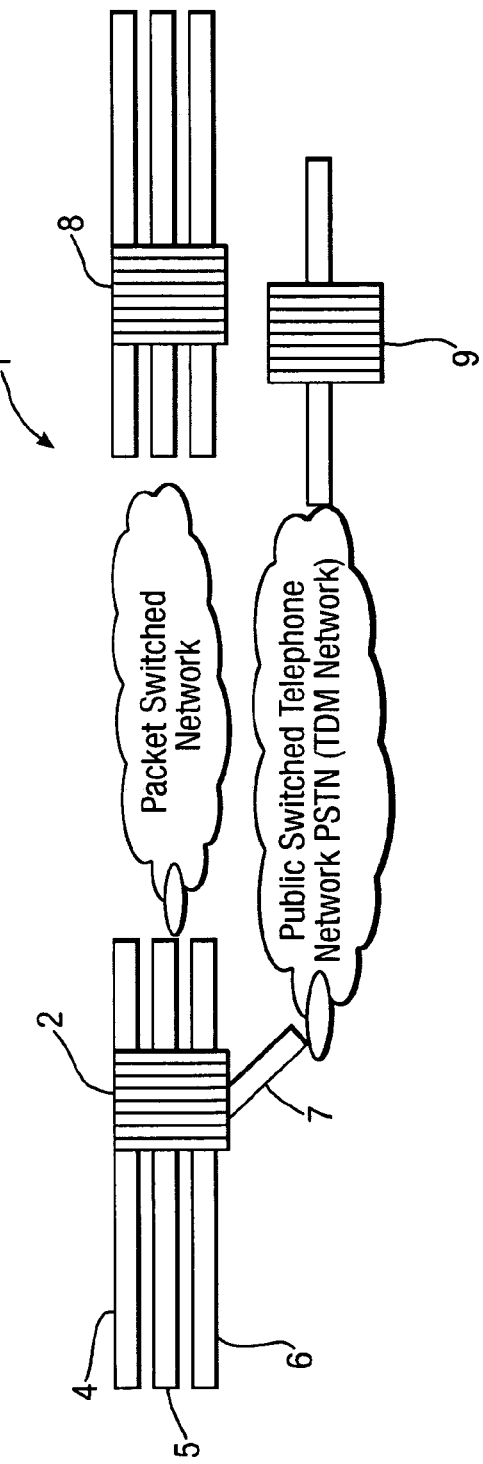
FIG. 1 shows a known network arranged to handle TDM traffic which is to be conveyed over a Packet Switched Network.
Figure 2:
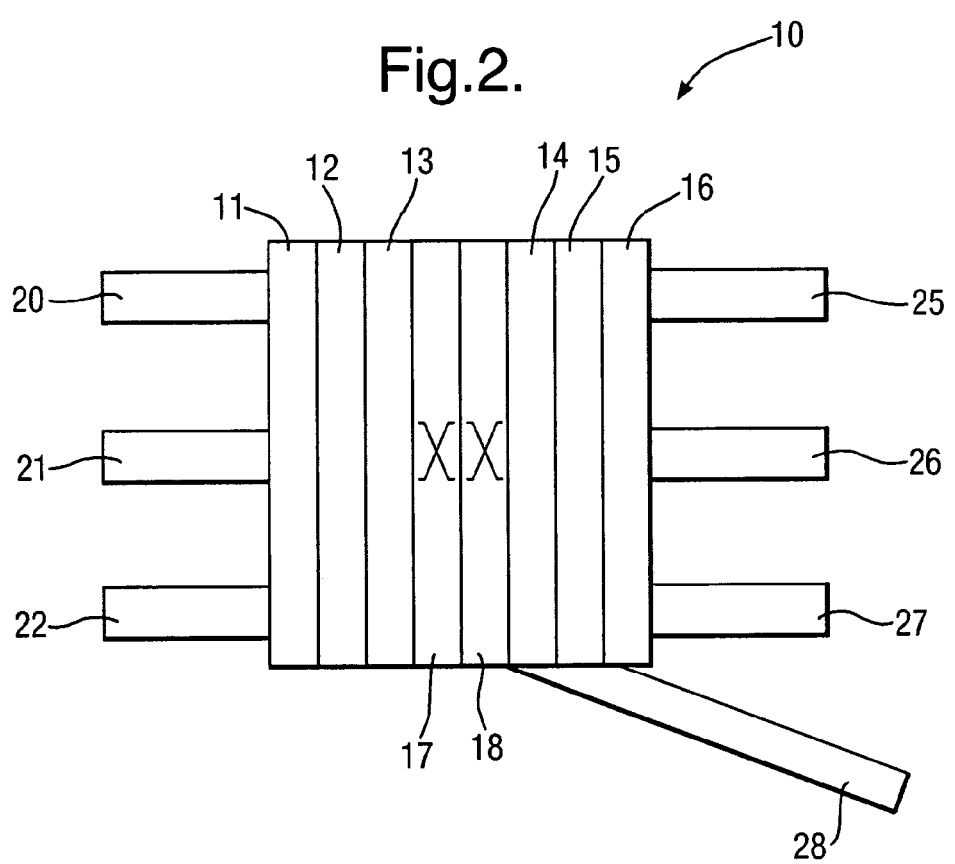
FIG. 2 is a schematic representation of a network node.

With reference to FIG. 2 an edge node 10 comprises a plurality of input traffic cards 11, 12 and 13 on a receiving side of the node, and a plurality of output traffic cards 14, 15 and 16 on a transmitting side of the node and a plurality of data switch fabric cards 17 and 18 therebetween. The switch fabric cards 17 and 18 connect the outputs of the input cards to the inputs of the output traffics cards. The fabric cards (typically two for redundancy) are able to packet switch the traffic interfaced by the traffic cards. Different flavours of traffic cards are available in order to offer different processing capabilities (e.g. Data interfaces, TDM interfaces to be terminated, TDM interfaces to be "Circuit Emulated", TDM interfaces to be cross-connected and so on). The node 10 further comprises input interfaces 20, 21 and 22 and output interfaces 25, 26, 27 and 28. The traffic cards and the fabric cards are located in a shelf assembly, with each card occupying a respective slot position, and the cards being suitably interconnected. The traffic cards on the receiving side packetize received TDM data and send it to one of the switch fabric cards; the switch fabric card then routes the packetised data towards an output card.

Every Multiplexing/Demultiplexing function which is performed when transferring the received data across the edge node 10 is coupled with a frequency adaptation process performed by the output traffic cards on the transmitting side of the node to accommodate the M slightly asynchronous flows. The frequency adaptation process is based upon a justification/dejustification process able to interpret and alter the justification control indications Cj of the flows.

Each TDM flow is received, in packetised fomat, by an output card and each flow is characterized by an instantaneous frequency that is a function of (i) its justification indications bits and (ii) of its ingress interface frequency.

$$f_{pq}(t)=F(f_{inq}(t); \Sigma Sigmac_{jp}(t))$$

So, the instantaneous frequency of the information stream, or flow, p received by an input card from an ingress interface q is a function of the ingress interface instantaneous frequency $f_{inq}(t)$ and of the cumulative effect of the justification control indications. X of these extracted information streams are cross-connected to an egress interface characterized by its own frequency $f_{out}$ (still within the required frequency accuracy of the system).

The egress multiplexing function performed by the output cards on the transmitting side will therefore have the task to multiplex the X egress frequencies $$f_{epq}(t)=f_{pq}(t)+\Delta f_{pq}(t) \quad 1)$$

$$f_{enm}(t)=f_{nm}(t)+\Delta f_{nm}(t) \quad 2)$$

$$f_{evw}(t)=f_{vw}(t)+\Delta f_{vw}(t) \quad x)$$

Where $\Delta f_{pq}(t)$ is the effect of the data switch fabric FDV on the information stream p from the ingress interface q.

The egress frequency adaptation and multiplexing function will have to accommodate these X flows to the egress interface $f_{out}$ generating the proper justification control indications. This adaptation process will have to face the undesired, often bursty, effects of the FDV $\Delta f_{pq}(t)$ that could result in unwanted and unacceptable justification movements (that will cause clock recovered smoothing problems in the consequent nodes with a general synchronization worsening).

In order to significantly simplify the processing by the output cards for the frequency adaptation process, each ingress card is configured to perform re-justification of all the information streams from the ingress interfaces to a common reference clock, namely the node's local, but system synchronised clock, before they are passed through a data fabric switch card. ITU G.783 Sn/Sm_A_So, ITU G.705 Pqe/Pyx_A_So or any other suitable process can be used by the input cards to adapt all the $f_{pq}(t)$ frequencies to a single common system reference one $f_{sys}(t)$ before they are routed to the output cards. The relations above therefore become:

$$f_{epq}(t)=f_{sys}(t)+\Delta f_{pq}(t) \quad 1)$$

$$f_{enm}(t)=f_{sys}(t)+\Delta f_{nm}(t) \quad 2)$$

$$f_{evw}(t)=f_{sys}(t)+\Delta f_{vw}(t) \quad x)$$

Since $f_{sys}$ is a known value, compensation of $\Delta f_{nm}(t)$ by the output traffic cards on the transmitting side will be a much more straightforward and much cheaper task since it will only need to take account of the FDV for each flow, and not also a (potentially) different respective nominal frequency of each flow received by the output cards. Importantly, it will allow the complete compensation of the fabric switch FDV effects in comparison with the simple reduction possible with complex and expensive filtering and cleaning circuits. Moreover this method will allow the reduction of the important overall TDM traffic elaboration latency avoiding the requirement of deep dejittering buffers tied to the egress filtering digital circuits.

Figure 3:
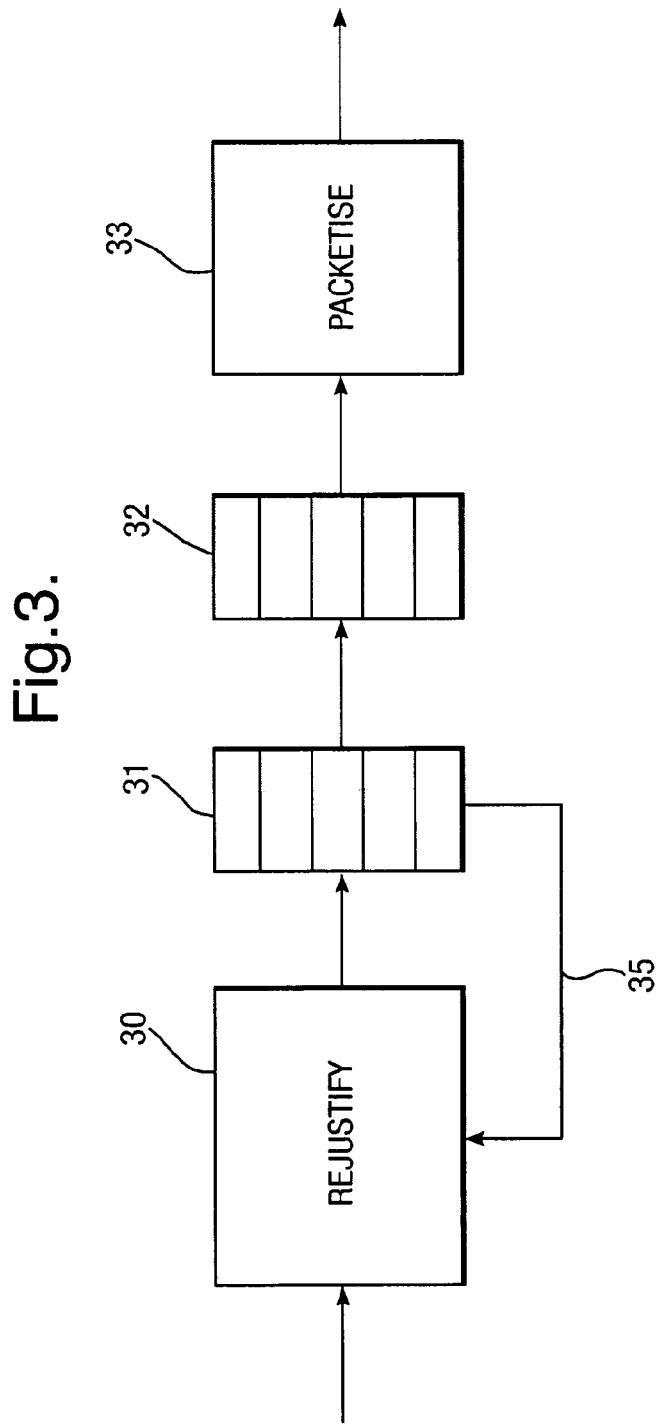
FIG. 3 is a schematic representation of various functional blocks of the network node.

Details of how the input cards perform this adaptation process are now described. Reference is made initially to FIG. 3 which is a schematic representation of various functional components of each of the input cards 11, 12 and 13. The functional components comprise a re-justification unit 30, a justification First In First Out (FIFO) buffer 31, a segmentation FIFO buffer 32 and a packetising unit 33. Each input card receives for example an SDH flow from a respective ingress interface 20, 21, 22 at a respective ingress interface frequency. The payload data from each respective SDH flow is received in TDM form by the re-justification unit 30 at the clock rate of the respective ingress interface. Bytes from the re-justification unit 30 are written into the justification buffer 31 at the same clock rate—ie the respective egress interface rate. However the rate at which payload bytes are written to the justification buffer from the re-justification unit 30 can be varied as described in more detail below. The filling level of the justification buffer 31 is monitored and a control signal 35 dependent on this filling level is sent to the re-justification unit 30. Data in the justification buffer 31 is read out at a rate equal to that of the clock of the node. The read data is then written into the segmentation buffer 32. Should the control signal 35 indicate that the instantaneous level of filling is above a predetermined filling threshold, re-justification of the received TDM traffic is effected so as to reduce the frequency of data being written into the buffer 31. The predetermined filling threshold may be any suitable filling level, including an experimentally determined level. For example 10% above or below a half filling level may be used. The re-justification is achieved by way of the re-justification unit 30 repositioning the (temporal) position of the first payload byte of a frame to another position within that frame as well as amending the pointer byte of each frame accordingly, the pointer byte indicating which byte position of the payload region corresponds to the first byte of payload data of that frame. For example the payload bytes may be delayed by one time slot each in order to reduce the average ingress frequency at which bytes are written to the justification buffer. This in turn will lower the fill level of the justification buffer 31, thereby more closely matching the rate at which payload bytes are received from the ingress interface with the rate at which these payload bytes are fed to the switch fabric—via the segmentation and packetizing functions 32 and 33. By such repositioning the frequency of payload data from one frame to a subsequent frame, the time period between receiving the last byte of payload of a first frame and the first byte of a subsequent frame can be varied such that the overall or average frequency of the payload data is altered. Conversely, if the filling level of the justification buffer is too low (i.e. below the predetermined optimum filling level) then the first bytes of subsequently received data can be re-justified accordingly. Monitoring of the filling level of the justification buffer serves as a measure of the frequency of data written into the buffer.

After having been routed to a particular output card by the switching fabric, the output card then only needs to take account of the FDV to ensure that the data frequency of TDM output is as required.

Figure 4:
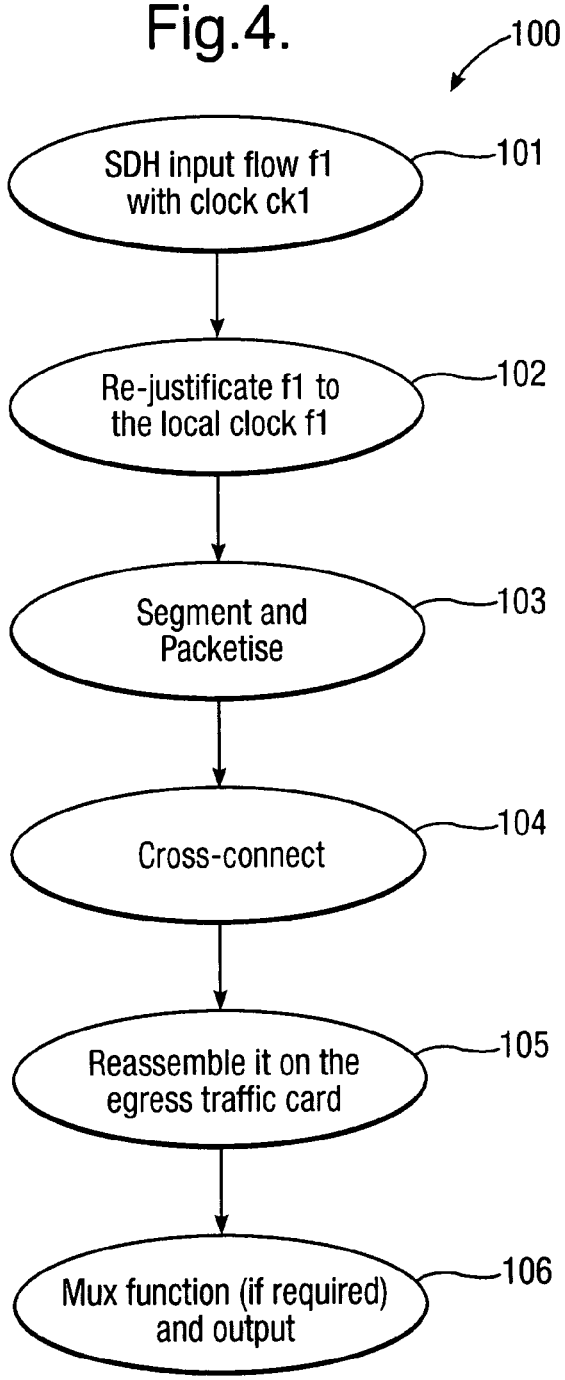
FIGS. 4, 5, 6 and 7 are flow diagrams showing the functionality of a network node.
Figure 5:
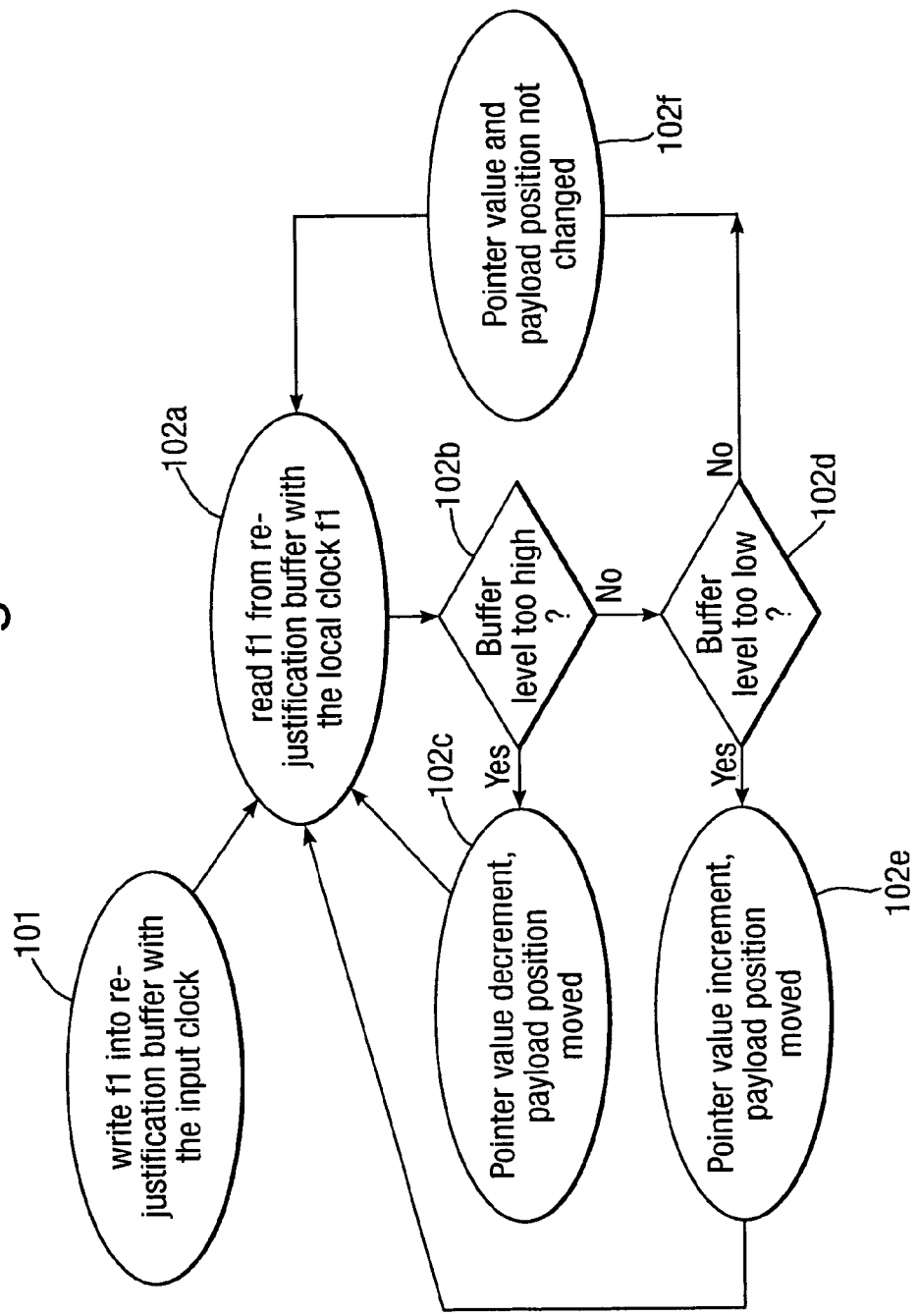
Figure 6:
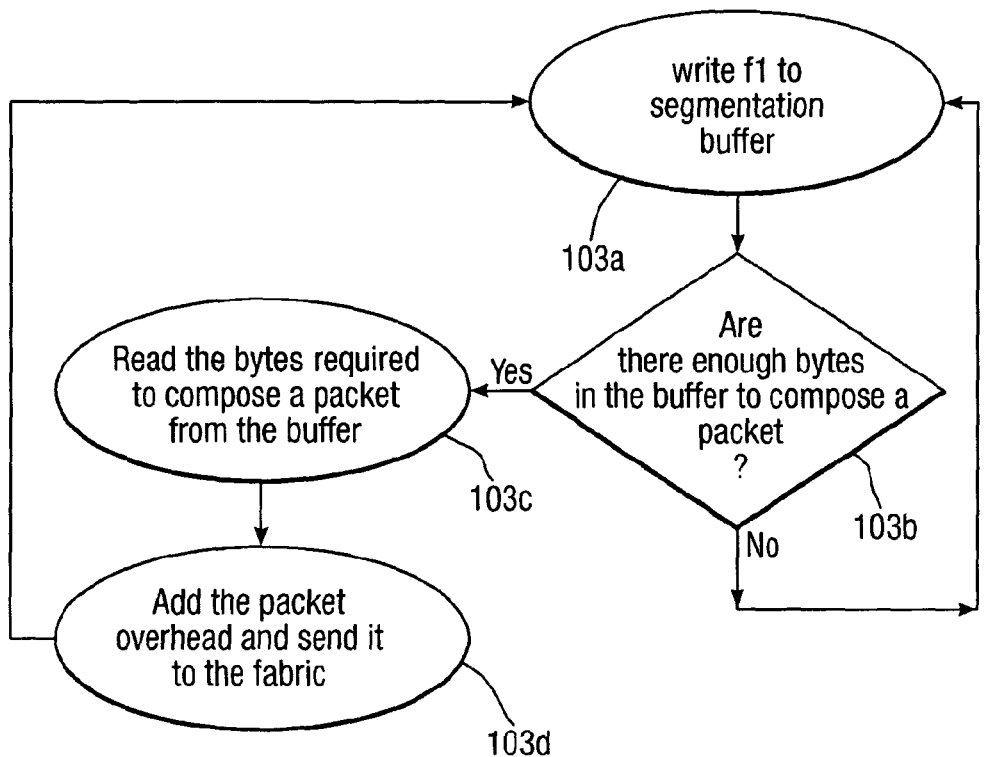
Figure 7:
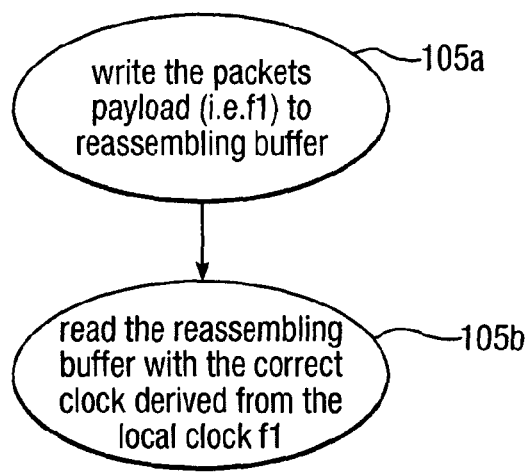

The flow diagram in FIG. 4 shows the overall process steps 101 to 106 performed by the edge node. FIG. 5 shows the detailed sub-steps 102a to 102f of step 102. FIG. 6 shows the sub-steps of step 103. FIG. 7 shows the sub-steps of step 105.

The node 10 offers an advantageous solution to face the FDV effects that a data switch fabric has when it is used to emulate a TDM cross-connect from ingress to output TDM interfaces. Adapting all the ingress information streams to a common well known frequency before switching provides a cost-effective and safe egress FDV compensation avoiding the need to filter and clean the received flows to a set of unknown asynchronous ingress frequencies. From this point of view it will allow a TDM cross-connect emulation through a data fabric switch with improved performance and with a less expensive way obtaining in this manner an agnostic flexible high performance and low cost switch system.

The invention claimed is:

1. A network node comprising input equipment, switching equipment and output equipment, wherein:
   the input equipment is arranged to receive at its ingress interfaces time division multiplexed (TDM) traffic flows, wherein said TDM traffic flows are not synchronous among themselves;
   the input equipment is further arranged to be capable of packetising the TDM traffic flows;
   the switching equipment is arranged to be capable of routing the packetised data from the input equipment to the output equipment; and
   the output equipment is arranged to be capable of reassembling the flows into time division multiplexed format,
   and wherein the input equipment is also arranged to perform adaptation of all traffic flows from the ingress interfaces to a common reference clock, wherein adaptation of all traffic flows comprises repositioning a temporal position of a first payload byte of a frame to another position within the frame.

2. The network node as claimed in claim 1, in which the output equipment is arranged to be capable of processing the packetised data so as to output TDM traffic with a predetermined TDM data frequency.

3. The network node as claimed in claim 2, in which the output equipment is arranged to be capable of correcting for a variable delay characteristic caused by the packetised data being routed across the switching equipment.

4. The network node as claimed in claim 1, in which the input equipment is arranged to be capable of monitoring a measure of the data frequency of the received data traffic.

5. The network node as claimed in claim 4, in which the input equipment is arranged to be capable of comparing the data frequency of received data to a predetermined measure of data frequency.

6. The network node as claimed in claim 1, in which the input equipment is arranged to be capable of modifying the data frequency of received data before it is sent to the switching equipment.

7. The network node as claimed in claim 5, in which the input equipment is arranged to be capable of modifying the data frequency of received data before it is sent to the switching equipment; and in which the input equipment is arranged to be capable of modifying the data frequency in response to the comparison to the predetermined measure of data frequency.

8. The network node as claimed in claim 6, in which the output equipment is arranged to be capable of altering a temporal position of data relative to a respective time frame.

9. The network node as claimed in claim 8, in which the output equipment is arranged to be capable of altering a temporal position of payload data.

10. The network node as claimed in claim 1, in which the input equipment comprises a buffer which is arranged to store data received by the input equipment and a level of filling of the buffer is monitored which provides a measure of the frequency of the received data.

11. The network node as claimed in claim 10, in which the input equipment is arranged to be capable of modifying the temporal position of payload data before it is stored in the buffer in response to a comparison of the level of filling in said buffer to the predetermined filling level.

12. Data processing equipment which is configured to be capable of packetising time division multiplexed (TDM) traffic flows received at ingress interfaces, wherein said TDM traffic flows are not synchronous among themselves, and the equipment being suitable for connection to packet data switching equipment, and the data processing equipment is arranged such that, in use, the flows are processed to adapt all traffic flows from ingress interfaces to a common reference clock, wherein adaptation of all traffic flows comprises repositioning a temporal position of a first payload byte of a frame to another position within the frame.

13. A method of processing time division multiplexed (TDM) traffic flows, wherein said TDM traffic flows are not synchronous among themselves, comprising processing the flows to adapt all traffic flows to a common reference clock and to generate packetised data, routing the packetised data across switching equipment and then converting the packetised data into time division multiplexed format, wherein adaptation of all traffic flows comprises repositioning a temporal position of a first payload byte of a frame to another position within the frame.

14. A machine readable storage medium having stored thereon instructions for controlling data processing equipment, which when run by the data processing equipment cause the equipment to process received time division multiplexed (TDM) traffic flows of TDM data, wherein the TDM traffic flows are not synchronous among themselves, such that all traffic flows are adapted to a common reference clock and packetised data is output by the data processing equipment, wherein adaptation of all traffic flows comprises repositioning a temporal position of a first payload byte of a frame to another position within the frame.

* * * * *

UNITED STATES PATENT AND TRADEMARK OFFICE
CERTIFICATE OF CORRECTION

PATENT NO. : 8,891,369 B2
APPLICATION NO. : 12/809588
DATED : November 18, 2014
INVENTOR(S) : Toscano et al.

It is certified that error appears in the above-identified patent and that said Letters Patent is hereby corrected as shown below:

In the specification

In Column 1, Line 22, delete "Hierachy" and insert -- Hierarchy --, therefor.

In Column 1, Line 23, delete "Hierachy" and insert -- Hierarchy --, therefor.

In Column 3, Lines 14-19, should read $$-- f_{in1}(t) = f_{nom} + \Delta f_{in1}(t) \qquad \Delta f_{in1}(t) < \Delta f_{in}$$

$$f_{in2}(t) = f_{nom} + \Delta f_{in2}(t) \qquad \Delta f_{in2}(t) < \Delta f_{in}$$

..............................................................

$$f_{inN}(t) = f_{nom} + \Delta f_{inN}(t) \qquad \Delta f_{inN}(t) < \Delta f_{in} \text{ --, therefor.}$$

In Column 4, Lines 35-36, delete "Network." and insert -- Network, --, therefor.

In Column 5, Line 7, delete "fomat," and insert -- format, --, therefor.

In Column 5, Line 23, delete "frequencies" and insert -- frequencies. --, therefor.

In Column 5, Line 27, should read -- $f_{enm}(t) = f_{nm}(t) + \Delta f_{nm}(t)$    2) --, therefor.

In Column 5, Line 55, should read -- $f_{enm}(t) = f_{sys}(t) + \Delta f_{nm}(t)$    2) --, therefor.

Signed and Sealed this
Third Day of May, 2016

Michelle K. Lee
*Director of the United States Patent and Trademark Office*